US012597563B2

(12) United States Patent
Morimitsu et al.

(10) Patent No.: US 12,597,563 B2
(45) Date of Patent: Apr. 7, 2026

(54) CAPACITOR AND METHOD FOR MANUFACTURING THE SAME

(71) Applicant: Rubycon Corporation, Nagano (JP)

(72) Inventors: Norimasa Morimitsu, Nagano (JP); Tomonao Kako, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 105 days.

(21) Appl. No.: 18/710,546

(22) PCT Filed: Nov. 14, 2022

(86) PCT No.: PCT/JP2022/042170
§ 371 (c)(1),
(2) Date: May 15, 2024

(87) PCT Pub. No.: WO2023/090278
PCT Pub. Date: May 25, 2023

(65) Prior Publication Data
US 2025/0010400 A1    Jan. 9, 2025

(30) Foreign Application Priority Data

Nov. 16, 2021    (JP) ................................. 2021-186331

(51) Int. Cl.
H01G 4/232        (2006.01)
H01G 4/012        (2006.01)
(Continued)

(52) U.S. Cl.
CPC ............. H01G 4/232 (2013.01); H01G 4/012 (2013.01); H01G 4/18 (2013.01); H01G 4/30 (2013.01)

(58) Field of Classification Search
CPC .......... H01G 4/232; H01G 4/30; H01G 4/012; H01G 4/18
See application file for complete search history.

(56) References Cited

U.S. PATENT DOCUMENTS 5,905,628 A     5/1999  Okuno et al.
5,912,796 A  *  6/1999  Price ...................... H01G 4/232
                                                361/306.3
(Continued)

FOREIGN PATENT DOCUMENTS

CN        1175068 A      3/1998
DE     102015117452 A1    4/2017
(Continued)

OTHER PUBLICATIONS

International Preliminary Report on Patentability for PCT/JP2022/042170, mailed May 2, 2024, 4 pages.
(Continued)

*Primary Examiner* — David M Sinclair
(74) *Attorney, Agent, or Firm* — BLANK ROME LLP

(57)        ABSTRACT

There is provided a capacitor (1) including a main body (10), in which a plurality of dielectric layers (13) and a plurality of electrode layers (11) are alternatively laminated, and an external electrode (20) that is connected to at least part of the main body. Before forming an external electrode by metal spraying (metallikon) on the main body, at least part of a connection surface (30) where the metal spraying is performed is scanned with a laser beam (51) so that scanning marks (55) composed of concave-convex structures (35) are formed by the laser beam on at least part of the connection surface.

8 Claims, 7 Drawing Sheets

(51) Int. Cl.
   H01G 4/18        (2006.01)
   H01G 4/30        (2006.01)

(56)                References Cited

U.S. PATENT DOCUMENTS

| | | |
|---|---|---|
| 2013/0107421 A1 | 5/2013 | Zenzai et al. |
| 2018/0301283 A1 | 10/2018 | Tomizawa et al. |
| 2023/0170151 A1 | 6/2023 | Kako et al. |

FOREIGN PATENT DOCUMENTS

| | | | | |
|---|---|---|---|---|
| JP | H02129906 A | | 5/1990 | |
| JP | H04233217 A | | 8/1992 | |
| JP | 2003109837 A | | 4/2003 | |
| JP | 2004006495 A | | 1/2004 | |
| JP | 2013004916 A | * | 1/2013 | |
| JP | 2013118356 A | | 6/2013 | |
| JP | 2015177172 A | | 10/2015 | |
| WO | WO-2013150077 A1 | * | 10/2013 | ............. H01G 4/232 |

OTHER PUBLICATIONS

International Search Report and Written Opinion of the International Searching Authority for PCT/JP2022/042170, mailed Jan. 24, 2023, 5 pages (with partial English translation).
Extended European Search Report Issued in European Patent Application No. 22895560.5, mailed on Oct. 2, 2025, 10 pages.

* cited by examiner (a)

(b)

( a )

( b )

( c )

( d )

( e )

(a)

(b)

(c)

(d)

(a)

OBSERVED PLANE A

OBSERVED PLANE B    30

OBSERVED PLANE C

OVERVIEW OF OBSERVED PLANES

10a (b)

35    36

30

33

31

OBSERVED PLANE A (c)

30

33

31

OBSERVED PLANE B (d)

30

OBSERVED PLANE C ( a )　　　　( b )　　　　( c )

· WITH DIAGONAL LINES ( a ) 55    30      ( b ) 55    30      ( c )    30

ANGLE : 0°      ANGLE : 45°      ANGLE : 90°

· WITH INTERSECTING LINES ( d )    30      ( e ) 55    30      ( f )    30

ANGLE : 0°      ANGLE : 30°      ANGLE : 60°

CAPACITOR AND METHOD FOR MANUFACTURING THE SAME

CROSS-REFERENCE TO RELATED APPLICATIONS

This application is a 371 of International Patent Application No. PCT/JP2022/042170, filed on Nov. 14, 2022, which claims the benefit of priority to Japanese Patent Application No. 2021-186331, filed on Nov. 16, 2021, the entire contents of which are incorporated herein by reference in their entirety.

TECHNICAL FIELD

The present invention relates to a capacitor and a method of manufacturing the same.

BACKGROUND ART

Japanese Laid-open Patent Publication No. 2004-6495 discloses a multilayer metalized film capacitor and a method of manufacturing the same. This capacitor is characterized in that a multilayer base, which has been produced by alternately stacking dielectric resin layers and aluminum layers that are vapor-deposited on the dielectric resin layers, is cut into stick shapes, a mixed gas containing two or more of $CF_3$, $CF_4$, and $O_2$ is activated and converted into plasma, a chemical dry etching process is performed to an etching depth of 10 to 100 μm on the cut surfaces, and metal is then sprayed on the etched surfaces to form electrode lead-out portions.

SUMMARY OF INVENTION

Multilayer capacitors that are small and have a high withstand voltage and a low ESR are available. It is also important for capacitors to have favorable and stable connections to external electrodes and to achieve favorable withstand voltage characteristics. As one example, unlike a film capacitor, a polymer multi-thin-layer capacitor can have dielectric layers as thin as 1.5 μm or even thinner, which makes it possible to provide a small capacitor with a high withstand voltage (achieved higher voltage) and low ESR. On the other hand, if the thickness of electrode parts (that is, internal electrode parts) of the capacitor portion are made sufficiently thin to achieve a high surface resistivity (sheet resistivity) and thereby increase the withstand voltage, the parts that connect to the external electrodes will also become thinner. This increases the connection resistance of the connected parts, which makes it difficult to sufficiently reduce the ESR. Use of a heavy edge structure where only edge parts are made thicker is also being investigated. To provide a capacitor that is small, has a high withstand voltage, and has even lower connection resistance, it is important to make the connections with external electrodes even more stable.

One aspect of the present invention is a method of manufacturing a capacitor including a main body, in which a plurality of dielectric layers and a plurality of electrode layers are alternately laminated (stacked), and an external electrode that is connected to at least part of the main body. This method of manufacturing includes scanning with a laser beam, before the external electrode is formed by metal spraying on the main body, at least part of a connection surface of the main body, which is to be subjected to the metal spraying and at which the ends of the plurality of dielectric layers and the ends of the plurality of electrode layers are exposed. This scanning of the connection surface with a laser beam (scanning, scanning step, or scanning process) may be used in place of a surface treatment with plasma or used together with a plasma treatment. By irradiating the connection surface with a laser beam, the connection surface can be processed so that the structure and/or shape of at least a part of the connection surface is cyclically changed at appropriate intervals (or pitch). As one example, to achieve a stable connection with an external electrode formed by metal spraying, concave-convex structures (convexes and concaves, concave-convex shapes, concave-convex surface, corrugate structures) may be stably formed in the connection surface. In contrast to processing with a laser beam, plasma processing is fundamentally ashing of the dielectric layer. The amount of ashing will depend on the formed state of the dielectric layers, since the distribution of plasma can be uneven, variations tend to be produced in the processed amounts. This means that it is difficult to control the state of the electrode layers at the connection surface with a plasma treatment or with a plasma treatment alone. According to the present invention, the connection surface is scanned with a laser beam. With this method, it is possible to forcibly melt and vaporize not only the ends of the dielectric layers but also the ends of the electrode layers, which can cyclically introduce two- or three-dimensional structures or shapes, which are effective to connect more stably and more favorably with sprayed metal, into the connection surface.

The scanning (process or step of scanning) with a laser beam may include forming scanning marks (traces) on the connection surface using a laser beam. The scanning may include forming three-dimensional scanning marks on the connection surface. The scanning may include forming concave-convex structures (convexes and concaves) in at least part of the connection surface. As one example, by scanning the connection surface with a laser beam with a comparatively large spot diameter, convex parts (areas) and concave parts (areas) may be formed depending on the condition or the physical properties of the dielectric layers and/or the electrode layers. As another example, by scanning the connection surface with a laser beam with a comparatively small spot diameter, scanning marks that are convex and concave with a predetermined direction and/or shape can be formed, so that concave-convex structures having a predetermined shapes may be forcibly formed in the connection surface.

The scanning process may include forming, in at least part of the connection surface, a region where at least part of the ends of the plurality of electrode layers exposed at the connection surface are recessed with respect to at least part of the ends of the plurality of dielectric layers exposed at the connection surface. Electrode layers formed of a metal such as aluminum are easier to vaporize by scanning a laser than dielectric layers, and by recessing the ends of the electrode layers from the ends of the dielectric layers through irradiation with a laser, it is possible to form convex-concave structures that favorably connects to sprayed metal.

The plurality of electrode layers may each include a heavy edge portion that is connected to an internal electrode layer laminated (stacked) inside the main body, which is exposed at one end to the connection surface, and which is thicker than the internal electrode layer, and the scanning process may include scanning the ends of the plurality of heavy edge portions exposed at the connection surface and the ends of the plurality of dielectric layers exposed at the connection surface with a laser beam. Although connectivity with an external electrode tends to fall when the electrode layers appearing at the connection surface are too thick, by producing sufficient convex-concave structures through irradiation with a laser beam, this fall in connectivity can be suppressed. Since the thicker heavy edge portions become recessed due to irradiation with the laser, the convex-concave structures between the dielectric layers and the electrode layers tend to become larger, which can improve the connectivity with an external electrode.

At least one of a YVO4 laser, a YAG laser, a fiber laser, a semiconductor laser, an excimer laser, and a CO2 laser can be given as examples of the laser beam used in the scanning process.

This method of manufacturing may further include the following steps.

Manufacturing a multilayer body by alternately forming the plurality of dielectric layers and the plurality of electrode layers.

Cutting the multilayer body into strips to form the main body portion in strip shapes (stick shapes).

Scanning, with the laser beam, surfaces produced by cutting into strips as the connection surfaces.

Forming the external electrode by spraying metal on the connection surface that has been scanned by the laser beam.

Cutting the main body portion in strip shapes, on which the external electrode has been formed, together with the external electrode into chips. If a plasma treatment may be omitted due to applying the scanning treatment with a laser beam, the processes after (from) the cutting of the multilayer body into strips may be performed in the atmosphere, which further simplifies the manufacturing process for a capacitor. This means that capacitors can be provided at even lower cost.

Another aspect of the present invention is a capacitor including a main body, in which a plurality of dielectric layers and a plurality of electrode layers are alternately laminated (stacked), and an external electrode that is connected to at least part of the main body. The main body portion of this capacitor further includes scanning marks (traces) provided by scanning with a laser beam on at least part of a connection surface of the main body where the external electrode is formed by metal spraying. The plurality of electrode layers may each include a heavy edge portion which is connected to an internal electrode layer laminated inside the main body, which is exposed at one end to the connection surface, and which is thicker than the internal electrode layer. The connection surface may include the scanning marks that cross the ends of the plurality of heavy edge portions appearing at the connection surface and the ends of the plurality of dielectric layers appearing at the connection surface.

Yet another aspect of the present invention is a capacitor including a main body, in which a plurality of dielectric layers and a plurality of electrode layers are alternately laminated, and an external electrode that is connected to at least part of the main body portion, the capacitor further including concave-convex structures, where at least part of the ends of the plurality of electrode layers are recessed with respect to at least part of the ends of the plurality of dielectric layers, on at least part of a connection surface of the main body where the external electrode is formed by metal spraying. The plurality of electrode layers of this capacitor may each include a heavy edge portion that is connected to an internal electrode layer laminated inside the main body portion, which is exposed at one end to the connection surface, and which is thicker than the internal electrode layer, and at least part of the ends of the plurality of heavy edge portions appearing at the connection surface may be recessed with respect to the ends of the plurality of dielectric layers appearing at the connection surface.

DESCRIPTION OF EMBODIMENTS

Figure 1:
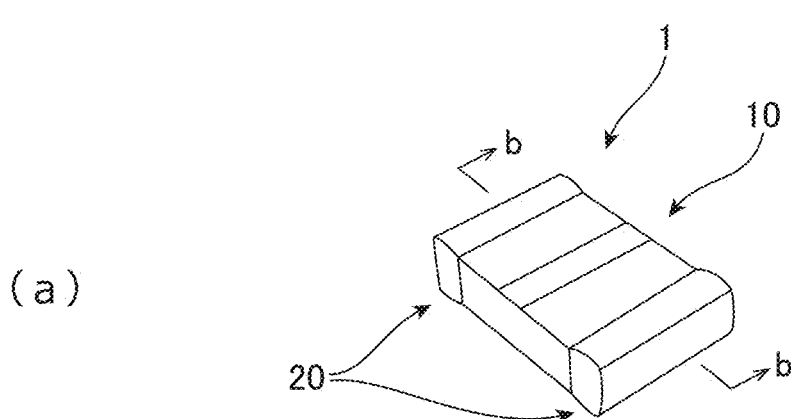
FIG. 1 depicts an overview of a capacitor.
Figure 1:
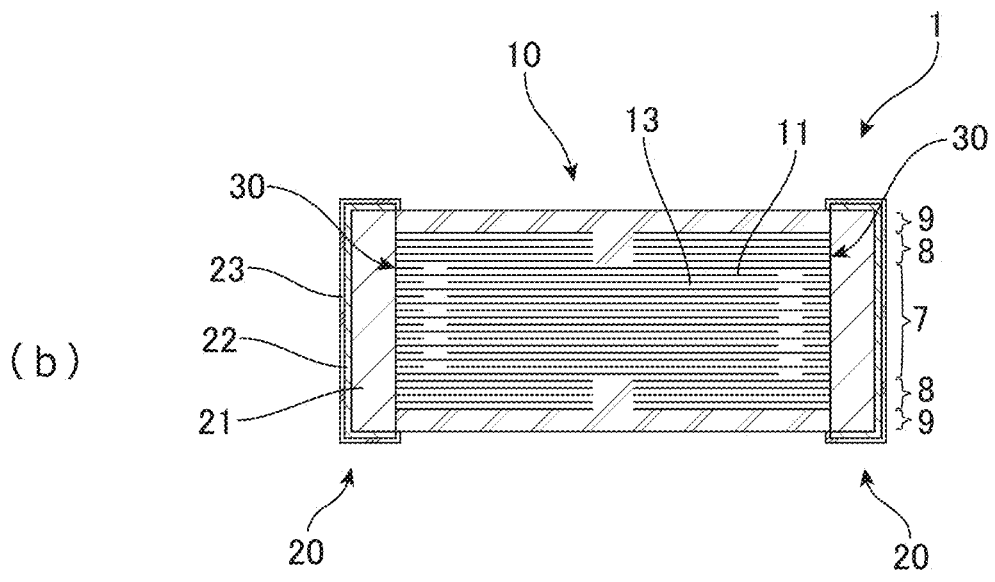

FIG. 1 depicts one example of a capacitor according to the present invention. As a capacitor 1 including a main body (main body portion, capacitor core, core, laminated body, multilayer body, or multilayer product) 10, in which a plurality of dielectric layers and a plurality of electrode layers are alternately laminated (stacked) and integrated, and external electrodes 20 each connected to the main body 10, polymer multi-thin-layer capacitors (Polymer Multi-Layer CAPacitor, thin-film polymer multilayer capacitor) are known. The capacitor 1, whose external appearance is depicted in FIG. 1(a), is one example of a polymer multi-thin-layer capacitor. As depicted in the cross-sectional view in FIG. 1(b), the main body 10 includes active layers 7, which are provided in the center in the thickness direction and produce a capacitance, dummy layers 8, which do not produce a capacitance and are disposed above and below the active layers 7, and protective layers 9, which are disposed above and below the dummy layers 8. The active layers 7 and the dummy layers 8 have structures where a plurality of resin layers (dielectric layers) 13 and a plurality of electrode layers 11 are alternately laminated (stacked with each other). The protective layers 9 are made of resin only. Each external electrode 20 includes an internal metalized layer (sprayed metal layer, metallikon layer, such as brass metallikon) 21 formed by spraying metal (metallikon, metallizing) so as to bond (joined, contacted, connected) to a connection surface 30 where the ends of the plurality of electrode layers 11 and the ends of the plurality of resin layers 13 of both the active layer 7 and the dummy layers 8 appear or expose, a copper plating layer 22 that surrounds the metallikon layer 21, and a tin plating layer 23 that further covers the outside of the copper plating layer 22.

Figure 2:
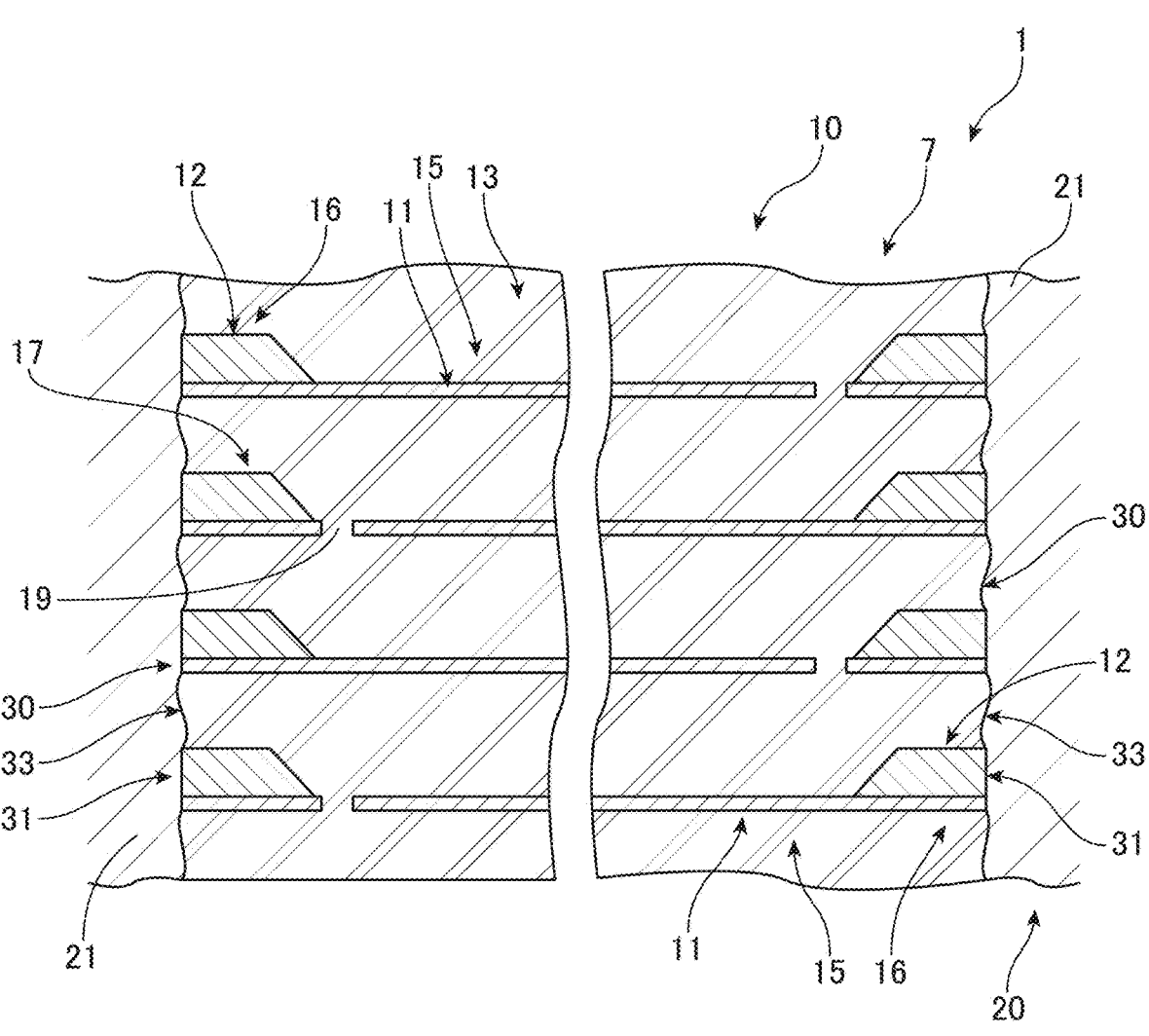
FIG. 2 is a cross-sectional view depicting an overview of an active layer (or laminated structure).

FIG. 2 depicts an enlarged cross-section of a part of the active layers 7 of the main body 10. The active layers 7 of the main body 10 are the part where the plurality of dielectric layers 13 and the plurality of electrode layers 11 are alternately laminated (stacked with each other). In an ideal state, at the connection surface 30, the ends (end portions, edge portions, connected parts, connected regions, or connection boundaries) 31 of each electrode layer 11 and the ends 33 of each dielectric layer 13 are bonded to the metallikon layer 21 of the external electrode 20, with each electrode layer 11 also electrically connected to the metallikon layer 21. Each electrode layer 11 includes an internal electrode part (internal electrode layer) 15, which is in the form of a thin film-like layer, broadly contacts the dielectric layers 13 inside the active layers 7 and forms a capacitance, and a heavy edge portion 16, where the end 31 that connects to the external electrode 20 (the metallikon layer 21) is made thicker than the internal electrode part 15. In the present embodiment, the heavy edge portion 16 of an electrode layer 11 is composed of the electrode layer 11 itself and a layer 12 that is laminated on the electrode layer 11. Accordingly, an internal electrode layer 15 is composed of an electrode layer 11, and each heavy edge portion 16 is constructed of the electrode layer 11 and the laminated layer (stacked layer) 12, so that the heavy edge portion 16 is connected to the internal electrode layer 15 and one end 31 of the heavy edge portion 16 is exposed to the connection surface 30. When providing a capacitor 1 with a high withstand voltage, it is desirable for the thickness of the internal electrode layer (internal electrode part) 15 to be thin, and may, for example, be 0.01 μm, or even thinner, such as 0.005 μm (5 nm). On the other hand, when considering the ability to connect to an external electrode 20, it is believed that a thickness of around 0.01 μm or greater is required, and for this reason, heavy edge portions 16 may be provided in a capacitor 1 provided with internal electrode parts 15 in the form of thin films. Note that when the internal electrode parts 15 have sufficient thickness, the heavy edge portions 16 may not need to be provided.

One example of the resin constructing of forming the dielectric layers 13 is a thermosetting resin, which includes acrylic polymers. One example of a resin that can be used in the polymer multi-thin-layer capacitor 1 is a resin in which one or more of tricyclodecane dimethanol dimethacrylate or tricyclodecane dimethanol diacrylate have been polymerized, but the resin that constructs the dielectric layers 13 is not limited to these materials. To provide a small, thin, and large capacity capacitor, the thickness of the dielectric layers 13 may be sufficiently reduced and the main body 7 may be provided with a sufficiently high number of laminated layers. As one example, the thickness of each of the dielectric layers 13 may be 0.1 to 1.5 μm, or 0.2 to 1.2 μm, and the number of laminated layers may be 1000 or higher. Thin dielectric layers 13 can be obtained with a predetermined thickness by depositing a thermosetting resin as a monomer in a reduced pressure environment (that is, in a vacuum) and curing the resin through irradiation with an electron beam or the like. A capacitor 1 equipped with dielectric layers 13 made of thermosetting resin has higher heat resistance than a capacitor made of thermoplastic resin, and is also compatible or applicable with reflowing, which makes it possible to provide an element which is more suited to surface mounting.

The electrode layer 11 may be formed of a conductive metal, for example, at least one of aluminum, zinc, copper, gold, silver, and an alloy containing these metals. For a high-voltage capacitor 1, the withstand voltage can be improved by reducing the thickness of the electrodes that function as a capacitor, that is, the internal electrode layers 15. As one example, the withstand voltage may be 400V or higher, and the thickness of the internal electrode layers 15 may be around 3 to 50 nm, or around 5 to 30 nm. Surface resistivity may be used to control the thickness of a thin layer film electrode, and the surface resistivity of the internal electrode layers 15 may be 5 to 80 Ω/square (Ω/sq.), or 15 to 60 Ω/sq. or 20 to 50 Ω/sq.

The electrode layers 11 of the capacitor 1 may further include dummy heavy edge portions 17 that are separated from the internal electrode layers 15 by gaps 19 and have one end exposed to the connection surface 30. Since the dummy heavy edge portions 17 are separated from the internal electrode layers 15, the dummy heavy edge portions 17 do not contribute to the capacitance of the capacitor 1. However, the dummy heavy edge portions 17 are useful for achieving mechanically strong connections with the metallikon (metallikon layer, sprayed metal) 21 of the external electrode 20, and maintain or strengthen the connections between the heavy edge portions 16, which are integrated with the internal electrode layers 15, and the metallikon layer 21. Accordingly, in the following description, the ends of the dummy heavy edge portions 17 and the ends 31 of the electrode layers 11 (the heavy edge portions 16) are treated the same. Note that in the present embodiment, the layers 12 that construct the heavy edge portions 16 may be laminated above the electrode layers 11, may be laminated below the electrode layers 11, or may be laminated on both the upper and lower surfaces. The heavy edge portions 16 are not limited to a two-layer structure, and may have a single-layer structure or may have a structure including three or more layers.

Although the withstand voltage can be increased by using thin film layers as the electrode layers 11, the loss coefficient (tan δ) and the equivalent series resistance (ESR) will increase, resulting in a tendency for performance as a capacitor to fall. For this reason, the configuration of the ends (or terminal portions) 31, which are the parts where the electrode layers 11 and the external electrodes 20 are connected, is important. It is conventionally believed that even if the internal electrode parts 15 are made thinner, by providing sufficient thickness at the end portions 31, which are the connected portions that connect to external electrodes 20, in the present embodiment, to the metallikon layer 21, tan δ and ESR will fall and the frequency characteristics will improve, which makes it possible to handle large currents.

In most multilayer capacitors, such as film capacitors and polymer multi-thin-layer capacitors, that have been commercialized, metallikon (metallization) layer 21 is used as the method of connecting the multilayer body (main body) 10 and the external electrodes 20. At present, it is difficult for methods aside from metallikon (metal spraying) to achieve the necessary mechanical strength for a capacitor. Metallikon can be applied for leading out of electrodes, in order to electrically connect the electrode layers 11 and the external electrode 20 with the metallikon, the inventors of this application believe it is necessary to expose the ends (terminal portions, end portions) 31 of the electrodes at the connection surface and at the same time create concave and convex structures on the connection surface, which produce an anchoring effect for achieving sufficient bonding strength with the metallikon layer 21, on the connection surface 30. For polymer multi-thin-layer capacitors, the shape of the electrodes drawn by a plasma-based ashing method, which is currently in standard usage, may be greatly affected by the state of the formed layers and be also influenced by unevenness in the distribution of plasma, which makes it difficult to produce sufficient concave and convex structures stably. For this reason, the inventors of the present application assume that it would be difficult to solve conventional problems, such as possibility of peeling off of the metallikon layer and degrading of electrical characteristics, for present mass production procedures that include only ashing using plasma.

During plasma processing using oxygen plasma (that is, the ashing process), concave and convex shapes may be produced by variations in the adhesion of plasma energy to the respective layers. In other words, it is believed that concave shapes are formed due to ashing progressing deeply in layers with weak adhesion that are susceptible to peeling, and convex shapes are formed due to ashing hardly progressing in layers where there is strong adhesion. For this reason, the concave and convex shapes formed by ashing will strongly depend on the deposited states of the respective layers, and the more uniform the adhesion between layers, the more difficult it is to produce concave and convex structures.

Figure 3:
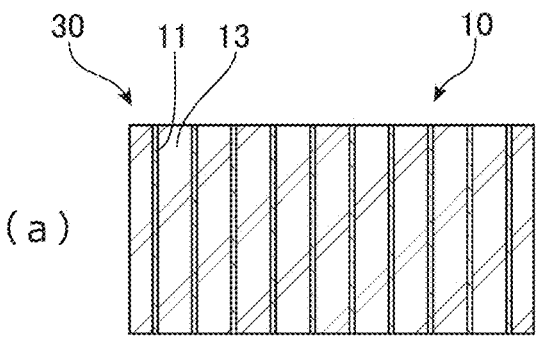
FIG. 3 depicts an overview of a plasma process.
Figure 3:
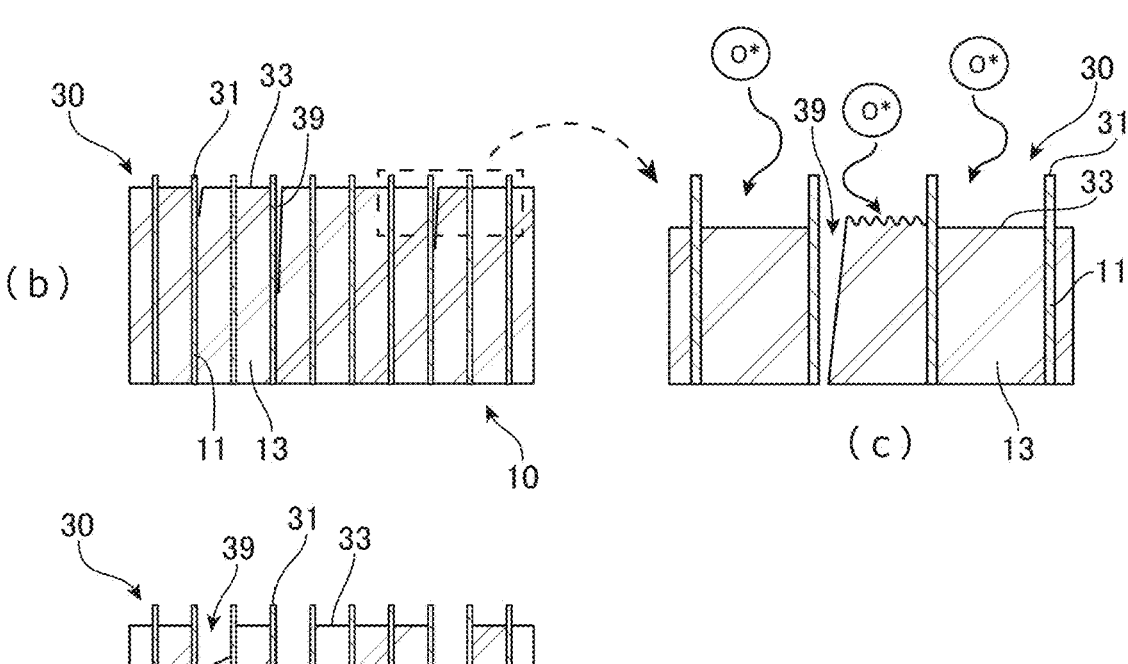
Figure 3:
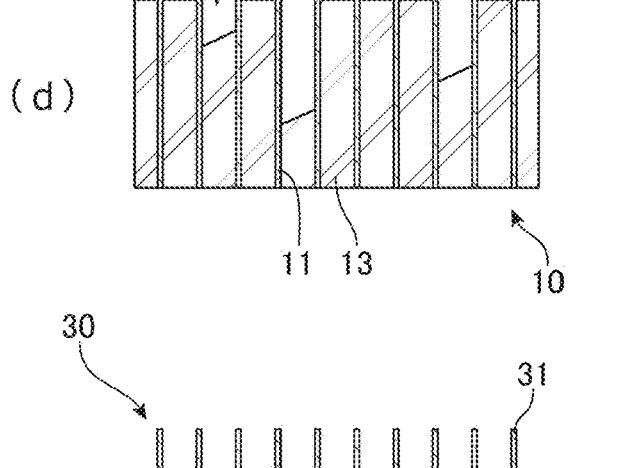

FIG. 3 depicts an overview of an assumed mechanism of ashing. Ashing is fundamentally a technique for uniformly etching organic matter. This means that to form concave and convex shapes, a high ashing rate and a certain amount of ashing time are required. On the other hand, there is a tendency whereby the thicker the dielectric layers, the smoother the ashing surface becomes, and changes in output and flow rate do not appear to make much of a difference. Accordingly, it is believed that the reason why ashing forms concave and convex shapes is that the energy provided by strong ashing emphasizes differences in adhesion between layers. The inventors of the present application found out from an analysis of parts joined to metallikon metal that even if connection surface 30 is flat in an initial state as depicted in FIG. 3(a), due to ashing, the end portions 33 of the dielectric layers 13 will be processed by ashing and delamination can occur from the end portion 31 of an electrode layer 11 as depicted in FIG. 3(b). This phenomenon is assumed to be caused by shrinkage of the end portions 33 of the dielectric layers 13 due to an ashing reaction caused by oxygen radicals, the heat of the plasma, and the like, as depicted in FIG. 3(c). As depicted in FIG. 3(d), it is believed that ashing will progress due to an increase in surface area at the peeled layer 39 that comes into contact with the oxygen radicals, thereby forming concave and convex shapes in the connection surface 30.

On the other hand, when, as depicted in FIG. 3(e), the plasma energy is too insufficient or excessive to cause differences in delamination (interlayer peeling), the ashing will progress uniformly, resulting in no concave and convex configuration being formed on the connection surface 30 and only the electrode layers 11 becoming exposed. This results in the risk that sufficient bonding force (connecting force, adhesion force) will not be achieved between the dielectric layers 13 and the external electrodes 20 so the adhesion required to stably connect and/or bond the external electrodes 20 will not be obtained.

Figure 4:
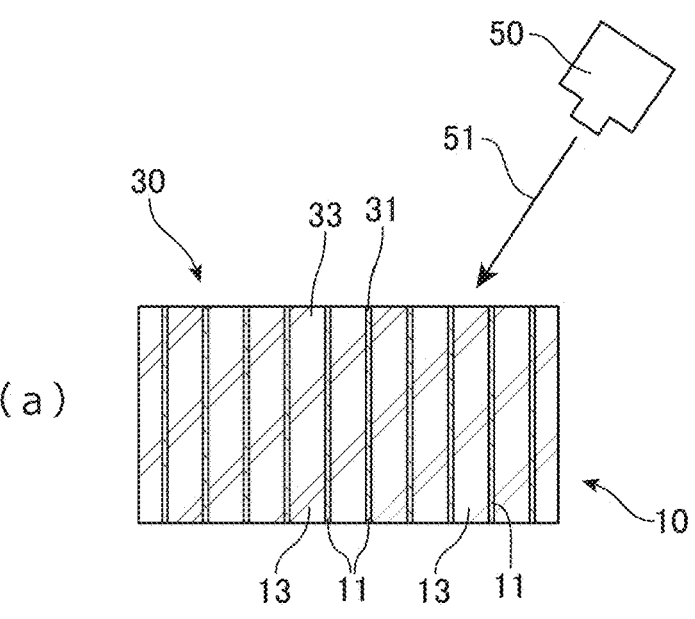
FIG. 4 depicts an overview of processing by a laser beam.
Figure 4:
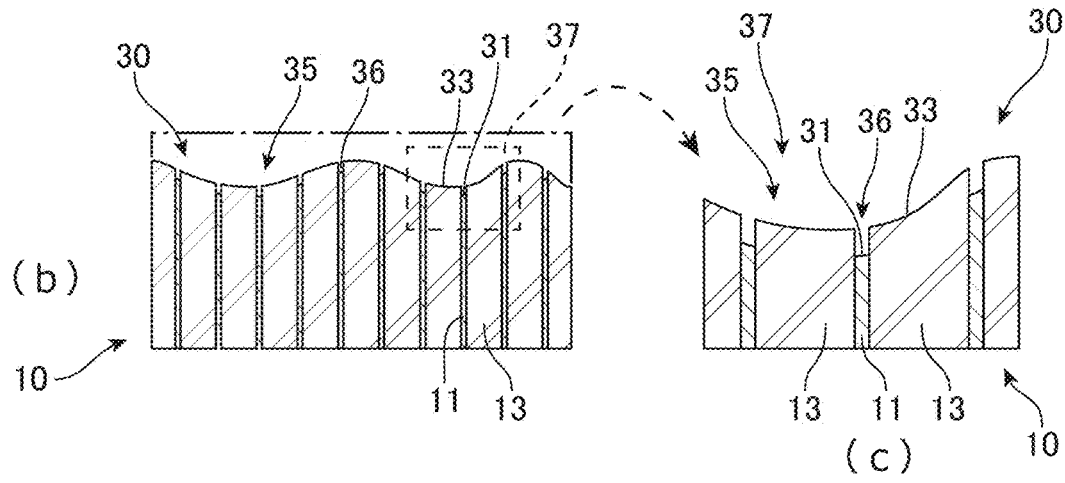
Figure 4:
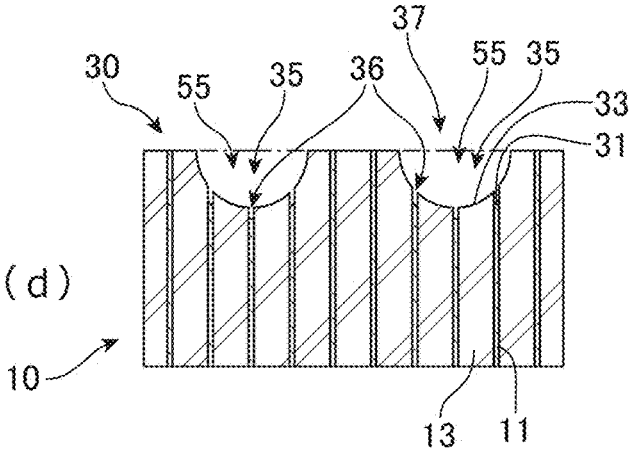

As depicted in FIG. 4, in the present invention, in place of the plasma treatment or in addition to the plasma treatment, prior to metallikon (metal spraying), a process that scans at least part of the connection surface 30, where the ends 33 of the plurality of dielectric layers 13 and the ends 31 of the plurality of electrode layers 11 are exposed and which is to be sprayed with metal (on which the metallikon layer is to be formed), with a laser beam or beams (laser, laser lights) is performed. As depicted in FIG. 4(a), the connection surface 30 of the main body 10 is scanned by a laser beam 51 emitted from a laser light source 50. In more detail, as will be described later, surfaces produced by cutting the multilayer body (laminated structure) that is the base of the main bodies 10 into strips (stick shapes) are scanned with a laser beam 51 as the connection surfaces 30, so that the connection surfaces 30 is laser-treated by or through irradiation of the connection surfaces 30 with the laser beam 51. The laser treatment spatially (that is, in two-dimensions or three-dimensions) introduces cyclical changes (differences) in structures or shapes into the ends 31 of the plurality of electrode layers 11 that are exposed to the connection surface 30 and the ends 33 of the plurality of resin layers 13 that are exposed to the connection surface 30, which is believed to contribute to stronger adhesion to the external electrodes 20 by the metallikon (sprayed metal).

The largest contribution made by the laser treatment may be the cyclical concave and convex structure introduced by the laser treatment into both of the ends 31 of the plurality of electrode layers 11 and the ends 33 of the plurality of resin layers 13 exposed to the connection surface 30 by the laser treatment. Examples of the laser used for the treatment include a YVO4 laser (with a wavelength of 1064 nm), a YAG laser (with a wavelength of 1064 nm), a fiber laser (with a wavelength of 1090 nm), a semiconductor laser (with a wavelength of 650 to 905 nm), an excimer laser (with a wavelength of 193 nm), and $CO_2$ laser (with a wavelength of 10600 nm). Examples of semiconductor lasers include GaAs, GaAlAs, and GaInAs.

The laser light 51 may be pulsed, and when a YVO4 laser is used for example, in settings where the output may be 3 to 30 W, the scanning speed may be 100 to 10,000 mm/s, the pulse frequency may be 1 to 200 kHz, and the scanning pitch may be 0.01 to 0.2 mm can be used.

Figure 5:
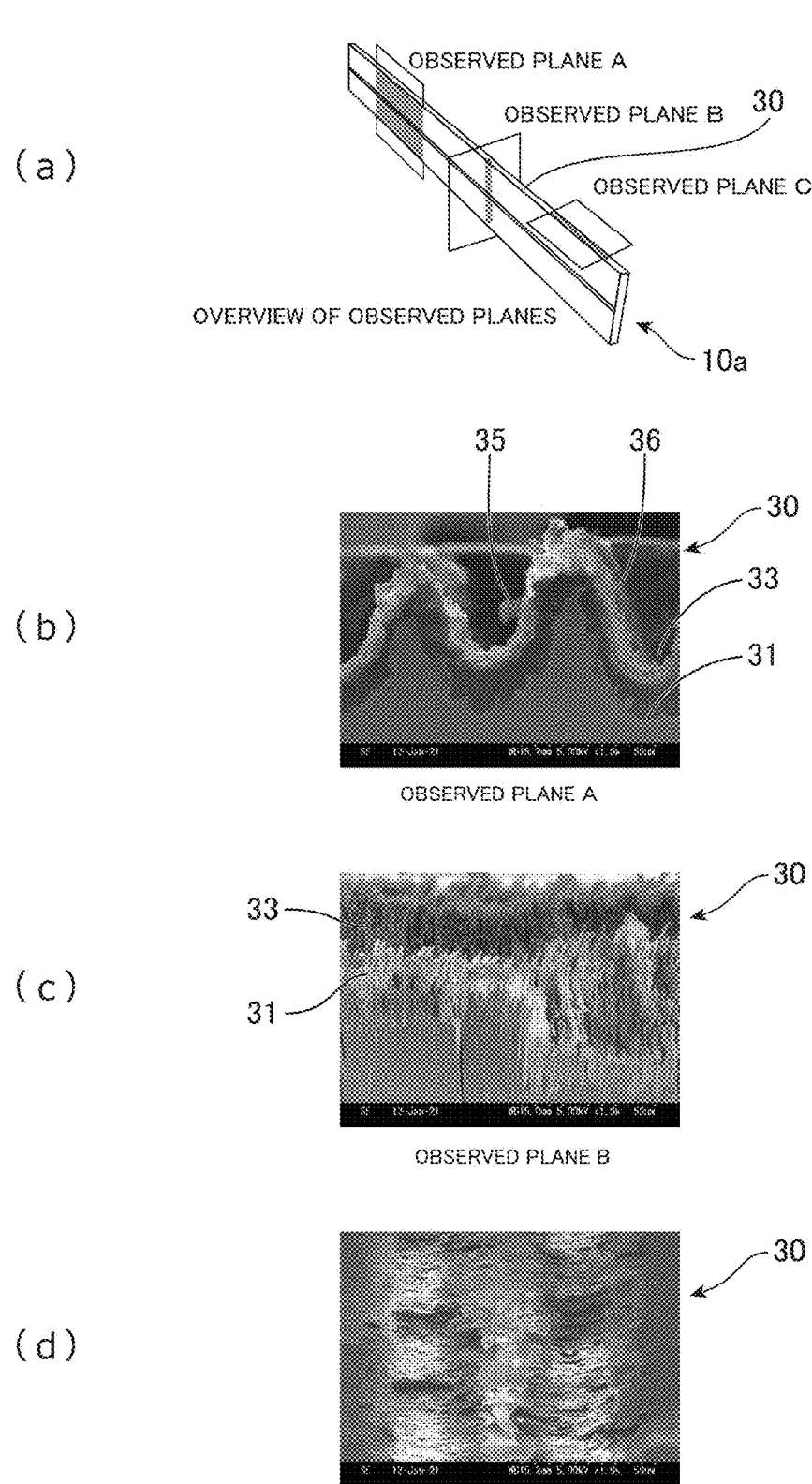
FIG. 5 depicts one example of processing by a laser beam.

FIG. 5 depicts the results of observing the condition (concave and convex, state) of the connection surface 30, which has been scanned by the YVO4 laser 51 with an output of 10 W, a scanning speed of 1000 mm, a pulse frequency of 40 kHz, and a scanning pitch of 0.04 mm, using an electron microscope. As the electron microscope, a Hitachi S-3000H (where the observation conditions are an acceleration voltage of 5 kV and a working distance of 15 mm) was used. FIG. 5(a) depicts the positions of the observed planes. As described earlier, the laser treatment is performed on the main body in the form of strips (the stick-like main body) 10a before cutting into chips. The observed plane A in FIG. 5(b) depicts a cross section of the connection surface 30 along the stick-like main body 10a. The observed plane B in FIG. 5(c) depicts a cross section of the connection surface 30 that is perpendicular to the stick-shaped main body 10a. The observed plane C in FIG. 5(d) depicts a plane of the connection surface 30 along the stick-shaped main body 10a. As can be understood from the conditions of these observed planes, scanning with the laser beam 51 forms continuous concave-convex structures (repeated concave and convex structure, repeatedly concave-convex, repeatedly uneven shapes, corrugated shapes, macroscopic concave-convex structures, macroscopic unevenness structures) 35 on the connection surface 30, with microscopic concave-convex structures (microscopic uneven shapes) 36, where the ends 31 of the electrode layers 11 are respectively recessed from the ends 33 of the dielectric layers 13 being additionally formed.

FIG. 4(b) conceptually depicts the state of the connection surface 30 that has been scanned by the laser 51, with consideration to the observation results depicted in FIG. 5. By scanning the connection surface 30 with the laser 51, the electrode layers 11 may be forcibly melted and vaporized by a certain amount and the dielectric layers 13 may also be melted and vaporized by a certain amount. This process enables macroscopic concave-convex structures 35 to be formed in (that is, introduced into) the connection surface 30.

As depicted in an enlarged view in FIG. 4(c), By scanning the connection surface 30 with the laser 51, it may be possible to selectively melt and vaporize the ends 31 of the electrode layers 11 appearing or exposing at the connection surface 30 in addition to the macroscopic concave-convex structures. That makes it possible to form a region 37 where the ends 31 of the electrode layers 11 are recessed from the ends 33 of the dielectric layers 13, which produces gaps between the dielectric layers 13. For this reason, the uniform (distributed at predetermined intervals) concave-convex structures (that is, microscopic concave and convex structures) 36 can be formed in (that is, introduced into) the ends 33 of the dielectric layers 13 and the ends 31 of the electrode layers 11. In addition, since the ends 31 of the electrode layers 11 are vaporized by the laser beam 51, it may be possible to suppress the presence of exposed internal electrodes, which act as obstacles to metallikon entering into the concave and convex structures (including inter-layer gaps) 36 and a problem of ashing depicted in FIG. 3(*e*) may be solved. Due to these factors (reasons), in the region 37 where the microscopic concave-convex structures 36, of a level equal to the layer thickness, for example, a size of about 5 to 200 nm are formed between respective layers, it may also be possible for the metallikon layers 21 to evenly penetrate into the microscopic concave and convex structures 36, which means sufficient bonding strength and favorable electrical characteristics may be obtained even if the differences (penetration amount) of the microscopic concave and convex are not so large In addition, by scanning the laser beam 51 to melt and vaporize both the ends 33 of the dielectric layers 13 and the ends 31 of the electrode layers 11, macroscopic concave-convex structures 35 that are larger than the layer thickness, for example, a size of about 200 nm to 100 µm, are formed. It is thought that these macroscopic concave and convex structures 35 make it possible to suppress peeling due to stresses that may act between the metallikon layer 21 and the connection surface 30. It is, therefore, possible to manufacture a capacitor 1 including the metallikon layers 21 that have sufficient bonding and connecting strength to the main body 10 and favorable electrical characteristics. As one example, as depicted in FIG. 4(*d*), the macroscopic concave and convex structures 35 are formed by narrowing the spot diameter of the laser beam 51 to form three-dimensional scanning marks (traces) 55 that are clearly visible in limited locations on the connection surface 30. It is also conceivable to form regions 37 in which microscopic concave-convex shapes 36 are formed inside the concaves of the macroscopic concave and convex structures 35, and by forming three-dimensional scanning marks 55 on the connection surface 30 through a laser treatment, the regions 37 with the microscopic concave and convex shapes 36 may be automatically formed or introduced on at least part of the connection surface 30.

Note that in FIG. 4, a main body 10 for which the thickness of the ends 31 of the electrode layers 11 do not change is depicted as an example for the purpose of schematically describing an outline of the laser treatment. Regarding the laser treatment of the connection surface 30, the same process may be applied and the same effects may be provided even when the ends 31 of the heavy edge portions 16, which are thick relative to the internal electrode layers 15 that are in the form of thin layer, are exposed to the connection surface 30.

Figure 6:
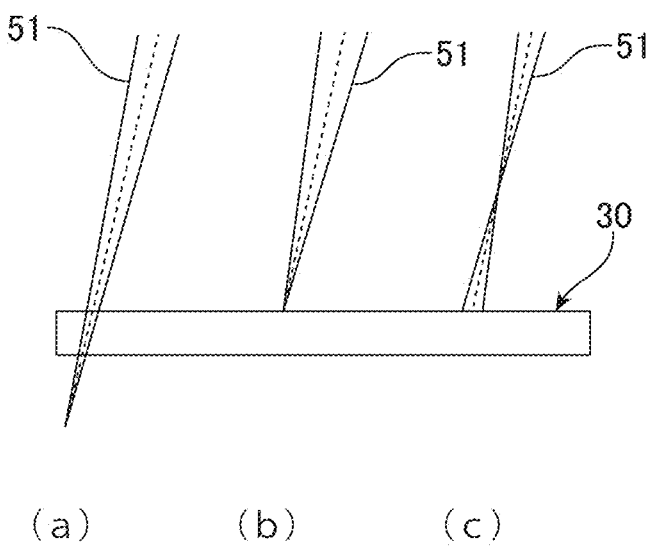
FIG. 6 depicts the state of a laser beam spot.

FIG. 6 depicts detailed examples of the laser treatment. When the connection surface 30 is irradiated with the laser beam 51, the spot diameter can be increased by defocusing (that is, shifting the focus) as depicted in FIGS. 6(*a*) and 6(*c*). On the other hand, as depicted in FIG. 6(*b*), it is also possible to reduce the spot diameter by focusing the laser beam 51 on the connection surface 30. By scanning the connection surface 30 with the laser beam 51 in a defocused state, the processing speed with the laser beam can be improved, and depending on the energy distribution of the defocused laser light 51, the scanning direction, and/or the intervals, the connection surface 30 may be scanned by the laser beam 51 with a relatively large scanning marks or with scanning marks that may not clearly appear. On the other hand, by scanning the connection surface 30 with the laser beam 51 in a focused state, clear scanning marks may be formed by the laser beam 51 on the connection surface 30.

Figure 7:
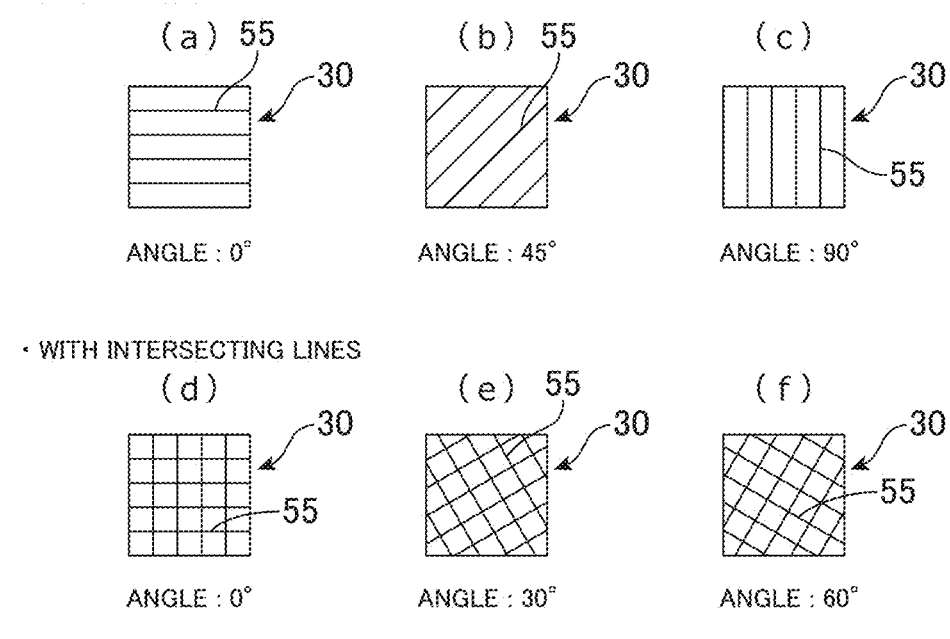
FIG. 7 depicts one example of scanning marks produced by a laser beam.

FIG. 7 depicts several examples of scanning marks (traces) 55 formed by the laser light 51 on the connection surface 30. FIGS. 7(*a*) to 7(*c*) depict examples of scanning marks 55 composed of patterns of only lines (diagonal lines) formed so as to be parallel or nearly parallel. FIGS. 7(*d*) to 7(*f*) depict examples of scanning marks 55 composed of patterns in which a plurality of lines intersect (cross). The "angle" of marks shown in the figures is indicated based on the direction in which the ends 33 of the dielectric layers 13 and the ends 31 of the electrode layers 11 appearing at the connection surface 30 extend. The scanning marks 55 depicted in FIG. 7 are mere examples, and the scanning marks formed by the laser beam 51 are not limited to these examples. Conditions such as the spot diameter and pattern (scanning marks) of the laser beam 51 that scans the connection surface 30 may be selected according to conditions such as the processing time required for treatment by the laser beam 51 and adhesion of the metallikon layer 21 to be made. It is also possible to scan the connection surface 30 in parallel with a plurality of laser beams 51. Regardless of the presence or absence of scanning marks, by using the laser beam 51 to irradiate the connection surface 30 where the metallikon layer 21 is to be bonded, the electrode layers 11 are selectively melted and vaporized by a certain amount, resulting in every end of layers being uneven alternatively. This makes it possible for the metallikon layer 21 to penetrate evenly between the layers and means that a sufficient anchoring effect and favorable electrical characteristics can be obtained.

Figure 8:
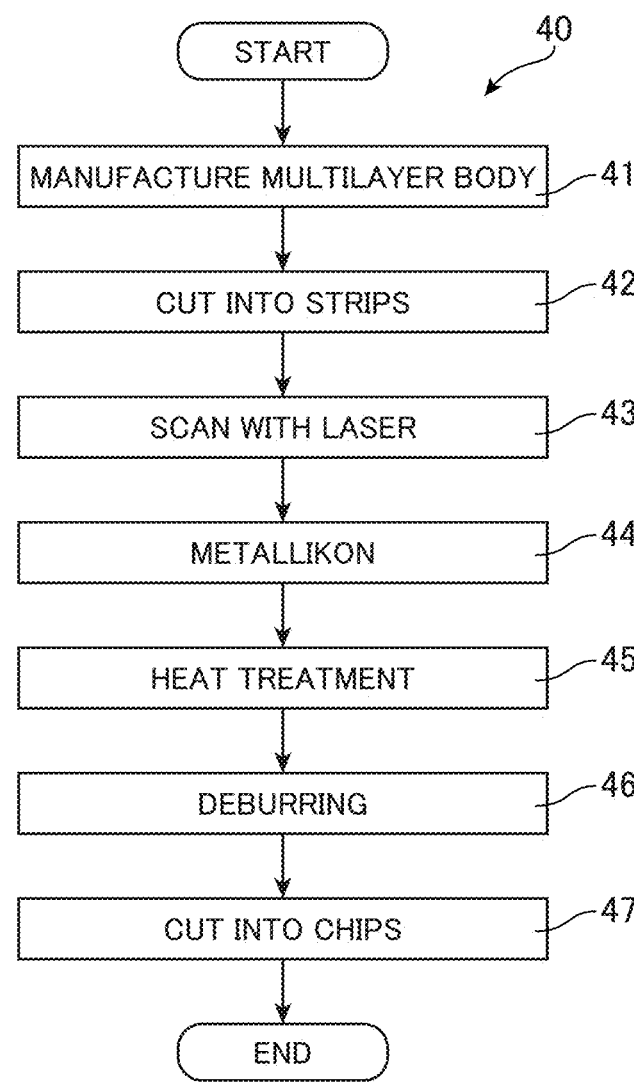
FIG. 8 is a flowchart depicting one example of a method of manufacturing a capacitor.

FIG. 8 is a flowchart depicting the principal part of a series of processes for manufacturing the capacitor 1. In this manufacturing method 40, in step 41, a multilayer body (laminated structure) that forms the base of the main body 10 is manufactured. An example of a method for manufacturing a multilayer body is a method where each layer is formed by vapor deposition. There is a known apparatus in which a plurality of dielectric layers 13 and a plurality of electrode layers 11 are alternately stacked (laminated) by alternately depositing a dielectric layer 13 and an electrode layer 11 by vapor deposition on a drum rotating in a reduced pressure environment (vacuum environment) inside a vacuum chamber to manufacture a multilayer body that serves as a base for the main body 10. The multilayer body may be manufactured using another method, such as coating or printing.

In step 42, the multilayer structure is cut into strips to form the main body 10*a* that are in a strip (stick)—like state. The main body 10*a* in strip-like shapes may be formed directly from the multilayer body, or the strip-shaped main body 10*a* may be provided by way of other processes, such as treatment with a flattening press or a card cutting process.

In step 43, a process that scans the surfaces produced by cutting into strips with the laser beam 51 is performed to produce the connection surfaces 30 that are to be processed with metallikon (metallized). In step 43, the spot of the laser beam 51 may be narrowed to form scanning marks 55 on the connection surface 30 using the laser beam 51. In this step 43, by irradiating the connection surface 30 with the laser beam 51, parts (the microscopic concave-convex structures) 36 where the ends 31 of the electrode layers 11 exposed at the connection surface 30 are recessed from the ends 33 of the plurality of dielectric layers 13 exposed at the connection surface 30 are formed in at least part of the connection surface 30. When each of the plurality of electrode layers 11 includes a heavy edge portion 16 which is connected to a thin-film internal electrode layer 15 that is laminated (stacked) inside the main body 10, which is exposed at one end to the connection surface 30, and which is thicker than the internal electrode layer 15, the laser beam 51 may scan the plurality of heavy edge portions 16 appearing or exposing at the connection surface 30 and the plurality of dielectric layers 13 appearing or exposing at the connection surface 30. The ends 31 of the heavy edge portions 16 that are thicker than the internal electrode layers 15 may be melted and vaporized by laser irradiation, and comparatively large concave-convex shapes 36 may be formed between adjacent dielectric layers 13 corresponding to the respective heavy edge portions 16. This means that the metallikon layer (sprayed metal) 21 can penetrate more evenly, making it possible to produce metallikon layers 21 with sufficient bonding strength and favorable electrical characteristics. When the dummy heavy edge portions 17 are provided, such dummy heavy edge portions 17 may also be laser-treated in the same way, making it possible to improve the adhesion between the connection surface 30 including the dummy heavy edge portions 17 and the external electrode 20.

In addition, in step 43, by scanning the contact surface 30 with the laser beam 51, scanning marks 55 may be formed by the laser light 51 on the connection surface 30. The scanning marks 55 may be three-dimensional scanning marks 55, and macroscopic concave-convex structures 35 may be introduced into the connection surface 30. In addition, since the bottoms (that is, concaves) in the macroscopic concave and convex structures 35 have the regions 37 where the microscopic concave-convex structures 36 are formed, in this step 43, it is possible to form microscopic concave-convex shapes 36 in at least some of the regions 37 on the connection surface 30.

In step 44, the external electrode 20 is formed by metallikon (metallization, metal spraying) on the connection surface 30 that has been scanned by the laser beam 51. Examples of suitable metallikon (sprayable) metals include zinc, tin, and brass. After this, required treatments are performed on the external electrode 20, such as heat treatment (step 45) and deburring (step 46). Then, in step 47, the main body 10a in a strip shape on which the external electrodes 20 have been formed is cut together with the external electrodes 20 into chip shapes, thereby manufacturing the capacitors 1 that each has the external electrodes 20 connected to a main body 10. Note that the steps depicted in FIG. 8 are representative processes, and other processes may also be performed. As one example, plating and other processes may be performed as appropriate between step 46 and step 47.

In this manufacturing method, the state (condition) of the connection surface 30 may be controlled by performing a plasma treatment (ashing) that is the same as in a conventional method before and/or after the process that scans with a laser beam (step 43). On the other hand, when it is possible to manufacture a capacitor with the external electrode 20 with sufficient bonding strength and favorable electrical characteristics using the laser beam scanning process (step 43) while omitting the plasma treatment, the processes from the cutting into strips onward can be performed in the atmosphere. This means that the manufacturing process of a capacitor can be further simplified. Accordingly, it is possible to provide a capacitor 1, which includes the main body 10 in which a plurality of dielectric layers 13 and a plurality of electrode layers 11 are stacked, and the external electrodes 20 that are connected to at least part of the main body 10, at a lower cost.

The capacitor 1 manufactured by this manufacturing method may include scanning marks 55 caused by the laser beam 51 on at least a part of the connection surface 30 of the main body 10 where the external electrode 20 is formed by the metallikon layer (sprayed metal) 21. In the capacitor 1 in which the electrode layers 11 are provided with the heavy edge portions 16 that are relatively thick compared to the internal electrode layers 15, the connection surface 30 may include scanning marks 55 that cross the plurality of heavy edge portions 16 appearing on the connection surface 30 and the plurality of dielectric layers 13 appearing on the connection surface 30. In addition, in the capacitor 1 manufactured by this manufacturing method, at least part of the connection surface 30 of the main body 10, where the external electrodes 20 are formed by metallikon layer 21, may include the regions 37 in which the concave-convex structure 36, where at least some of the ends 31 of the plurality of electrode layers 11 or the heavy edge portions 16 appeared on the connection surfaces are recessed from at least some of the ends 33 of the plurality of dielectric layers 13 appeared on the connection surfaces, are formed.

Note that although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. A method of manufacturing a capacitor including a main body in which a plurality of dielectric layers and a plurality of electrode layers are alternately laminated, and an external electrode that is connected to at least part of the main body, the method comprising, scanning with a laser beam,
   before the external electrode is formed by metal spraying on the main body, at least part of a connection surface of the main body, which is to be subjected to the metal spraying and at which ends of the plurality of dielectric layers and ends of the plurality of electrode layers are exposed, wherein the scanning includes forming, by the laser beam, in at least part of the connection surface, concave-convex structures of the ends of the plurality of dielectric layers, which are made of a thermosetting resin, and a region that includes the ends of the plurality of electrode layers recessed with respect to the ends of the plurality of dielectric layers, wherein the method of manufacturing further comprises forming the external electrode, by the metal spraying, on the connection surfaces that have been scanned by the laser beam, the external electrode being in the region, adhered to the ends of the plurality of dielectric layers without obstacles of presence of exposed electrode layers and bonded electrically with the recessed ends of the plurality of electrode layers.

2. The method of manufacturing according to claim 1, wherein the scanning includes forming scanning marks on the connection surface using the laser beam.

3. The method of manufacturing according to claim 1, wherein the scanning includes forming three-dimensional scanning marks on the connection surface using the laser beam.

4. The method of manufacturing according to claim 1, wherein the plurality of electrode layers each include a heavy edge portion that is connected to an internal electrode layer laminated inside the main body, which is exposed at one end to the connection surface, and which is thicker than the internal electrode layer, and the scanning includes scanning at least part of ends of a plurality of heavy edge portions exposed at the connection surface and at least part of ends of the plurality of dielectric layers exposed at the connection surface with the laser beam.

5. The method of manufacturing according to claim 1, wherein the scanning includes scanning with at least one of a YVO4 laser, a YAG laser, a fiber laser, a semiconductor laser, an excimer laser, and a CO2 laser.

6. The method of manufacturing according to claim 1, further comprising:

manufacturing a multilayer body by alternately forming the plurality of dielectric layers and the plurality of electrode layers; and cutting the multilayer body into strips to form the main body in strip shapes, wherein the scanning includes scanning, with the laser beam, surfaces produced by cutting into strips as the connection surfaces, and the method of manufacturing further comprises:

cutting, after the forming the external electrode, the main body in strip shapes, on which the external electrode has been formed, together with the external electrode into chips.

7. A capacitor comprising a main body, in which a plurality of dielectric layers and a plurality of electrode layers are alternately laminated, and an external electrode that is connected to at least part of the main body, the capacitor further comprising scanning marks produced by a laser beam on at least part of a connection surface of the main body where the external electrode is formed by metal spraying, wherein the scanning marks include concave-convex structures of the ends of the plurality of dielectric layers, which are made of a thermosetting resin, and a region that includes the ends of the plurality of electrode layers recessed with respect to the ends of the plurality of dielectric layers, and the external electrode is, in the region, adhered to the ends of the plurality of dielectric layers without obstacles of presence of exposed electrode layers and bonded electrically with the recessed ends of the plurality of electrode layers.

8. The capacitor according to claim 7, wherein the plurality of electrode layers each include a heavy edge portion that is connected to an internal electrode layer laminated inside the main body, which is exposed at one end to the connection surface, and which is thicker than the internal electrode layer, and the connection surface includes the scanning marks that cross at least part of ends of a plurality of heavy edge portions appearing at the connecting surface and at least part of ends of the plurality of dielectric layers appearing at the connection surface.

* * * * *